(12) United States Patent
Crupnicoff et al.

(10) Patent No.: US 8,213,315 B2
(45) Date of Patent: Jul. 3, 2012

(54) DYNAMICALLY-CONNECTED TRANSPORT SERVICE

(75) Inventors: Diego Crupnicoff, Buenos Aires (AR); Michael Kagan, Zichron Yaakov (IL); Ariel Shahar, Jerusalem (IL); Noam Bloch, Bat Shiomo (IL); Hillel Chapman, Ein Ha'emek (IL)

(73) Assignee: Mellanox Technologies Ltd., Yokneam (IL)

( * ) Notice: Subject to any disclaimer, the term of this patent is extended or adjusted under 35 U.S.C. 154(b) by 242 days.

(21) Appl. No.: 12/621,523

(22) Filed: Nov. 19, 2009

(65) Prior Publication Data

US 2011/0116512 A1    May 19, 2011

(51) Int. Cl.
   *H04L 12/26* (2006.01)
(52) U.S. Cl. ...................................... 370/236; 370/395.2
(58) Field of Classification Search .................. 370/229, 370/230, 230.1, 231, 235, 236, 395.2, 412, 370/419
   See application file for complete search history.

(56) References Cited

U.S. PATENT DOCUMENTS

| | | | |
|---|---|---|---|
| 7,688,838 B1 * | 3/2010 | Aloni et al. | 370/412 |
| 7,748,002 B1 * | 6/2010 | Beser | 718/102 |
| 7,835,380 B1 * | 11/2010 | Aloni et al. | 370/419 |
| 2003/0145094 A1 * | 7/2003 | Staamann et al. | 709/229 |
| 2006/0007926 A1 * | 1/2006 | Zur et al. | 370/389 |
| 2007/0005896 A1 * | 1/2007 | Chang et al. | 711/120 |
| 2007/0294426 A1 | 12/2007 | Huang et al. | |
| 2007/0299970 A1 * | 12/2007 | Huang et al. | 709/225 |
| 2008/0002578 A1 * | 1/2008 | Coffman et al. | 370/230 |
| 2009/0034551 A1 | 2/2009 | Elzur | |

OTHER PUBLICATIONS

International Application PCT/IB2010/054768 Search Report dated Mar. 15, 2011.
"Supplement to InfiniBandTM Architecture Specification vol. 1.2.1, Annex A14: Extended Reliable Connected (XRC) Transport Service", Revision 1.0, 2009.
"Infiniband Architecture: Specification vol. 1: Chapter 9: Transport Layer", Release 1.2.1, Infiniband Trade Association, Nov. 2007.
"Mellanox ConnectX IB: Dual-Port InfiniBand Adapter Cards with PCI Express 2.0", Mellanox Technologies, USA, 2008.

* cited by examiner

*Primary Examiner* — Kwang B Yao
*Assistant Examiner* — Nguyen Ngo
(74) *Attorney, Agent, or Firm* — D. Kligler I.P. Services Ltd.

(57) ABSTRACT

A method of communication includes receiving, in a network interface device, first and second requests from an initiator process running on an initiator host to transmit, respectively, first and second data to first and second target processes running on one or more target nodes, via a packet network. A single dynamically-connected initiator context is allocated for serving both the first and second requests. A first connect packet referencing the dynamically-connected (DC) initiator context is directed to the first target process so as to open a first dynamic connection with the first target process, followed by transmission of the first data over the first dynamic connection. The first dynamic connection is closed after the transmission of the first data, and a second connect packet is transmitted so as to open a second dynamic connection with the second target process, followed by transmission of the second data.

20 Claims, 7 Drawing Sheets

DYNAMICALLY-CONNECTED TRANSPORT SERVICE

FIELD OF THE INVENTION

The present invention relates generally to computer networks, and specifically to process communication over such networks.

BACKGROUND OF THE INVENTION

InfiniBand™ (IB) is a switched-fabric communications link primarily used in high-performance computing. It has been standardized by the InfiniBand Trade Association. Computing devices (host processors and peripherals) connect to the IB fabric via a network interface adapter, which is referred to in IB parlance as a channel adapter. Host processors (or hosts) use a host channel adapter (HCA), while peripheral devices use a target channel adapter (TCA).

InfiniBand is a scalable switch-based point-to-point interconnect architecture which defines both a layered hardware protocol (Physical, Link, Network, Transport Layers) and a software layer, which manages initialization and communication between devices. The transport layer is responsible for in-order packet delivery, partitioning, channel multiplexing and transport services. The transport layer also handles transaction data segmentation when sending and reassembly when receiving.

Based on the Maximum Transfer Unit (MTU) of the path, the transport layer divides the data into packets of the proper size. A receiver reassembles the packets based on a Base Transport Header (BTH) which contains the destination queue pair and packet sequence number. The receiver acknowledges the packets, and the sender receives these acknowledgements as well as updates the completion queue with the status of the operation.

InfiniBand specifies the following transport services:

Reliable Connection (RC). RC provides a reliable transfer of data between two entities. RC transport provides RDMA operations, atomic operations, and reliable channel semantics. As a connection-oriented transport, RC requires a dedicated queue pair (QP) for each pair of requester and responder processes.

Unreliable Connection (UC). UC facilitates an unreliable transfer of data between two entities. Unlike RC, UC messages may be lost. UC provides RDMA capability, but does not guarantee ordering or reliability. Each pair of connected processes requires a dedicated QP.

Reliable Datagram (RD). Using RD enables a QP to send and receive messages from one or more QPs using a reliable datagram channel (RDC) between each pair of reliable datagram domains (RDDs). RD provides most of the features of RC, but does not require a dedicated QP for each process.

Unreliable Datagram (UD). With UD, a QP can send and receive messages from one or more QPs, but the messages may get lost. UD is connectionless, allowing a single QP to communicate with any other peer QP. UD has a limited message size, and does not guarantee ordering or reliability.

Raw Datagram. A raw datagram is a data link layer service which provides a QP with the ability to send and receive raw datagram messages that are not interpreted.

A recent enhancement to InfiniBand is the Extended Reliable Connected (XRC) transport service (as described, for instance, in "Supplement to InfiniBand™ Architecture Specification Volume 1.2.1, Annex A14: Extended Reliable Connected (XRC) Transport Service", 2009, Revision 1.0, whose disclosure is incorporated herein by reference). XRC enables a single receive QP to be shared by multiple shared receive queues (SRQs) across one or more processes running on a given host. As a result, each process can maintain a single send QP to each host rather than to each remote process. A receive QP is established per remote send QP and can be shared among all the processes on the host.

SUMMARY OF THE INVENTION

In an embodiment of the present invention, a method of communication includes receiving, in a network interface device coupled to an initiator host, first and second requests from an initiator process running on the initiator host to transmit, respectively, first and second data to first and second target processes running on one or more target nodes, via a packet network. A single dynamically-connected initiator context is allocated in the network interface device for serving both the first and second requests. A first connect packet referencing the dynamically-connected (DC) initiator context and directed to the first target process is transmitted from the network interface device over the packet network so as to open a first dynamic connection with the first target process, followed by transmission of the first data over the first dynamic connection. The first dynamic connection is closed after the transmission of the first data, and a second connect packet referencing the DC initiator context and directed to the second target process is transmitted so as to open a second dynamic connection with the second target process, followed by transmission of the second data over the second dynamic connection.

In some embodiments, the method includes receiving an acknowledgment packet from one of the target nodes on which the first target process is running in response to transmitting the data. The network interface device typically transmits the first data over the first dynamic connection without waiting for any acknowledgment from the one of the target nodes. Additionally or alternatively, closing the first dynamic connection includes waiting to close the first dynamic connection until the network interface device has received the acknowledgment packet.

In a disclosed embodiment, closing the first dynamic connection includes transmitting a disconnect packet over the first dynamic connection to the first target process. Typically, the one or more target nodes do not acknowledge the disconnect packet, and the second connect packet is transmitted immediately after transmitting the disconnect packet.

In some embodiments, receiving the first and second requests includes queuing, for execution by the network interface device, one or more first work queue elements (WQEs) referencing the first target process, followed by one or more second WQEs referencing to the second target process, and the network interface devices closes the first dynamic connection upon reaching a first one of the second WQEs for execution.

The method may include receiving the first connect packet at a target node, allocating a DC responder context for receiving the first data at the target node, and after closing the first dynamic connection, reallocating the DC responder context at the target node to receive further data from another DC initiator. In a disclosed embodiment, allocating the DC responder context includes selecting the DC responder context from a group of DC responder contexts belonging to a DC target specified by the first connect packet. In another embodiment, receiving the first connect packet includes receiving and counting multiple connect packets at the target node from the DC initiator context in response to retries by the network interface device, and reallocating the DC target context after all of the connect packets have been received.

There is also provided, in accordance with an embodiment of the present invention, a network communication device, including a host interface, which is coupled to receive from an initiator host first and second requests from an initiator process running on the initiator host to transmit, respectively, first and second data to first and second target processes running on one or more target nodes, via a packet network. A network interface is coupled to the packet network. Processing circuitry is configured, using a single dynamically-connected initiator context allocated to serve both the first and second requests, to transmit via the network interface a first connect packet referencing the dynamically-connected initiator context and directed to the first target process so as to open a first dynamic connection with the first target process, followed by transmission of the first data over the first dynamic connection, and to close the first dynamic connection after the transmission of the first data and to transmit via the network interface a second connect packet referencing the dynamically-connected initiator context and directed to the second target process so as to open a second dynamic connection with the second target process, followed by transmission of the second data over the second dynamic connection.

There is additionally provided, in accordance with an embodiment of the present invention, a network communication system, including a first network interface device, which is coupled to an initiator host so as to receive first and second requests from an initiator process running on the initiator host to transmit, respectively, first and second data to first and second target processes running on one or more target nodes, via a packet network. The first network interface device is configured, using a single dynamically-connected initiator context allocated to serve both the first and second requests, to transmit via the network interface a first connect packet referencing the dynamically-connected initiator context and directed to the first target process so as to open a first dynamic connection with the first target process, followed by transmission of the first data over the first dynamic connection, and to close the first dynamic connection after the transmission of the first data and to transmit via the network interface a second connect packet referencing the dynamically-connected initiator context and directed to the second target process so as to open a second dynamic connection with the second target process, followed by transmission of the second data over the second dynamic connection. A second network interface device is coupled to a target host on a target node and is configured upon receiving the first connect packet, to allocate a DC responder context for receiving the first data at the target node, and after closing the first dynamic connection, to reallocate the DC responder context to receive further data from another DC initiator.

BRIEF DESCRIPTION OF THE DRAWINGS

The invention is herein described, by way of example only, with reference to the accompanying drawings, wherein.

DETAILED DESCRIPTION OF EMBODIMENTS

Figure 1:
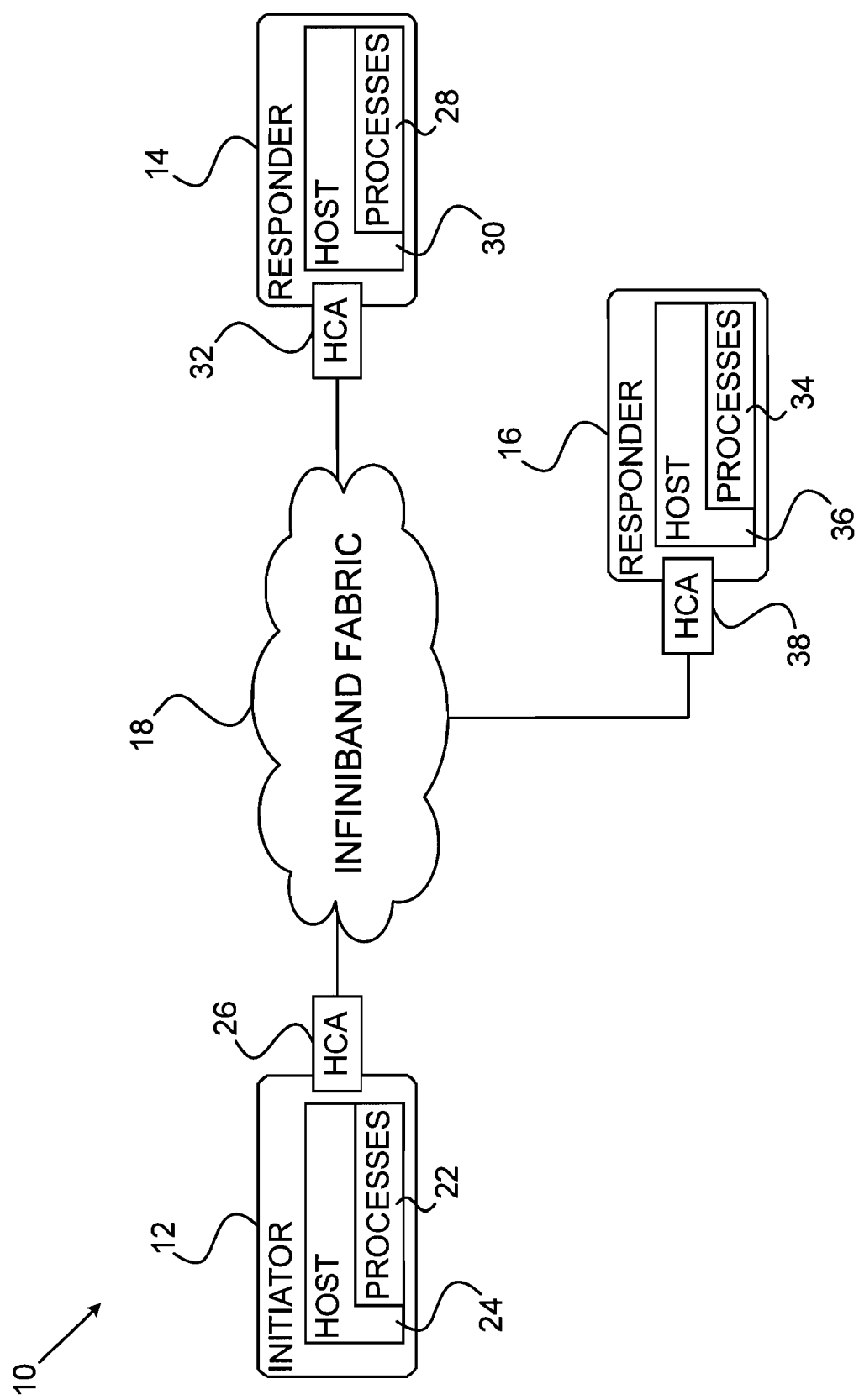
FIG. 1 is a block diagram that schematically illustrates a system operative to employ a dynamically-connected transport service, in accordance with an embodiment of the present invention.

The following notation is used throughout the document:

| Term | Definition |
| --- | --- |
| ACK | Acknowledgement |
| AV | Address Vector |
| BTH | Base Transport Header |
| DC | Dynamically Connected |
| DCT | DC Target |
| FCP | Fibre Channel Protocol |
| HCA | Host Channel Adapter |
| I/O | Input/Output |
| IB | InfiniBand ™ |
| LAN | Local Area Network |
| MTU | Maximum Transfer Unit |
| NACK | Negative Acknowledgement |
| PSN | Packet Switched Network |
| QP | Queue Pair |
| RC | Reliably Connected |
| RD | Reliable Datagram |
| RDC | Reliable Datagram Channel |
| RDD | Reliable Datagram Domain |
| RDMA | Remote Direct Memory Access |
| RQ | Receive Queue |
| SAN | Storage Area Network |
| SQ | Send Queue |
| SRQ | Shared Receive Queue |
| TCA | Target Channel Adapter |
| UC | Unreliable Connection |
| UD | Unreliable datagram |
| WAN | Wide Area Network |
| WQE | Work Queue Entry |
| WR | Work Request |
| XRC | Extended Reliable Connected |

Overview

Processes executing on nodes of an InfiniBand network communicate with one another using a queue-based model. Sending and receiving processes establish a queue pair (QP) which consists of a send queue (SQ) and a receive queue (RQ). Send and receive work requests (WR) by a host cause work queue elements (WQEs) to be loaded into these queues for processing by an InfiniBand channel adapter. To receive a message on a QP, a receive buffer is posted to that QP.

In embodiments of the present invention that are described hereinbelow, a dynamically-connected (DC) transport service is employed to reduce the number of required QPs per end-node while preserving RC semantics. The DC transport service provides a datagram-like model that allows a DC QP to reach multiple remote processes in multiple remote nodes. Each WR submitted to a DC send queue includes information identifying the targeted remote destination process. DC contexts are then dynamically tied to each other across the network to create a dynamic (i.e., temporary) RC-equivalent connection that is used to reliably deliver one or more messages. When the initiator (i.e., the HCA of the sending end-node) reaches a point in its send queue at which either there are no further WQEs to execute, or the next WQE is destined to another process (possibly in a different node), then the dynamic connection is torn down. The same DC context may then be used to establish a new dynamic connection to another destination process.

The DC transport service provided by embodiments of the present invention enables each process to maintain its own set of dedicated DC contexts that it exclusively owns. The DC transport service allows each DC transport context to target multiple remote processes in multiple remote nodes. To provide reliable delivery semantics, DC contexts are dynamically tied to each other across the network to create a temporary RC-equivalent connection that is used to reliably deliver one or more messages. The channel adapters create the dynamic connection in-band, by transmitting packets over the connection itself rather than requiring a separate signaling procedure. This in-band connection method supports pipelining of the subsequent data communication traffic, thereby eliminating the latency cost of a 3-way handshake. Once all messages posted for the specific destination are completed, the DC connections are torn down and the DC contexts become available for a new connection.

With the DC transport service, the number of DC connection contexts required by each node for full connectivity within a cluster is not influenced by the size of the cluster. Each process will typically require a number of DC contexts on the order of the number of connections that the process can drive in parallel, plus additional DC contexts for processing inbound requests. The required number of DC contexts for each end-node is therefore driven by the capabilities of each respective end-node.

Since the DC transport service allows for a datagram-like connectivity model (in a connected context), the traditional notion of a QP should be modified when dealing with DC. The DC initiator and responder contexts may be treated as independent entities, which are not tied in pairs and not even created as such. When a DC initiator is tied to a DC responder at a given remote node, it does not mean that there has to be a complementary connection in the reverse direction at the same time. This feature of DC allows a process to independently determine the number of DC initiator and DC responder contexts that it needs in order to satisfy its connectivity requirements. It also simplifies the DC connection semantics, since they are strictly one-sided.

System Description

FIG. 1 is a block diagram that schematically illustrates a system 10 operative to employ a dynamically-connected transport service, in accordance with an embodiment of the present invention. System 10 comprises nodes 12, 14 and 16 on a network 18. In this example, node 12 is an initiator node, and nodes 14 and 16 are responder nodes (although typically, any given node may be both an initiator and a responder simultaneously). Network 18 is a packet network, such as an IB switched fabric communications network.

In this example, an initiator process from a group of processes 22 executing on a host 24 submits a work request to a HCA 26 to send a message to a responder process from a group of processes 28 executing on a host 30. Upon receiving the work request, HCA 26 attempts to establish a dynamic connection with a HCA 32 of the responder node by sending a "DC Connect" packet, as described hereinbelow. After sending the DC connect packet, HCA 26 then sends one or more data packets to the responder process over the dynamic connection in order to fulfill the work request. Upon receiving the data packets, HCA 32 replies by sending one or more acknowledgement packets to the dynamically-connected receive queue of HCA 26. Once all the WQEs on HCA 26 relating to this responder process have been executed, HCA 26 and HCA 32 tear down the association between the initiator and responder processes, and the DC context on HCA 26 becomes available to connect with other processes.

Thus, for example, the initiator process from the group of processes 22 executing on host 24 may initially submit a first work request to a HCA 26 to send one or more messages to a first responder process from the group of processes 28 executing on host 30, and subsequently submits a second work request to HCA 26 to send one or more messages to a second responder process from a group of processes 34 executing on a host 36. Upon receiving the first work request, HCA 26 establishes a dynamic connection with HCA 32 and conveys data packets as described above. Once HCA 26 has finished executing the WQE corresponding to the first work request (including sending the data packets and receiving the appropriate acknowledgment from the responder) and detects a second WQE targeting a different responder process, HCA 26 sends a DC disconnect packet to HCA 32 in order tear down the association between the responder process and the DC context.

HCA 26 then attempts to establish a dynamic connection with HCA 38 of the second responder node by sending a DC connect packet. After sending the DC connect packet, HCA 26 sends one or more data packets to the second responder process over the dynamic connection in order to fulfill the second work request. Upon receiving each message data packet, HCA 38 sends an acknowledgement to the dynamically-connected receive queue of HCA 26. Once all the WQEs relating to the second responder process have been executed, HCA 26 sends a DC disconnect packet to HCA 38 in order tear down the association between the responder process and the DC context.

Although the simple example presented above relates to a single dynamic connection between an initiator process and two successive responder processes, a single DC context may be used in connecting successively to three or more responder processes, on the same target node or multiple different target nodes. Furthermore, a given initiator process may use multiple DC contexts to communicate over multiple dynamic connections of this sort concurrently.

Figure 2:
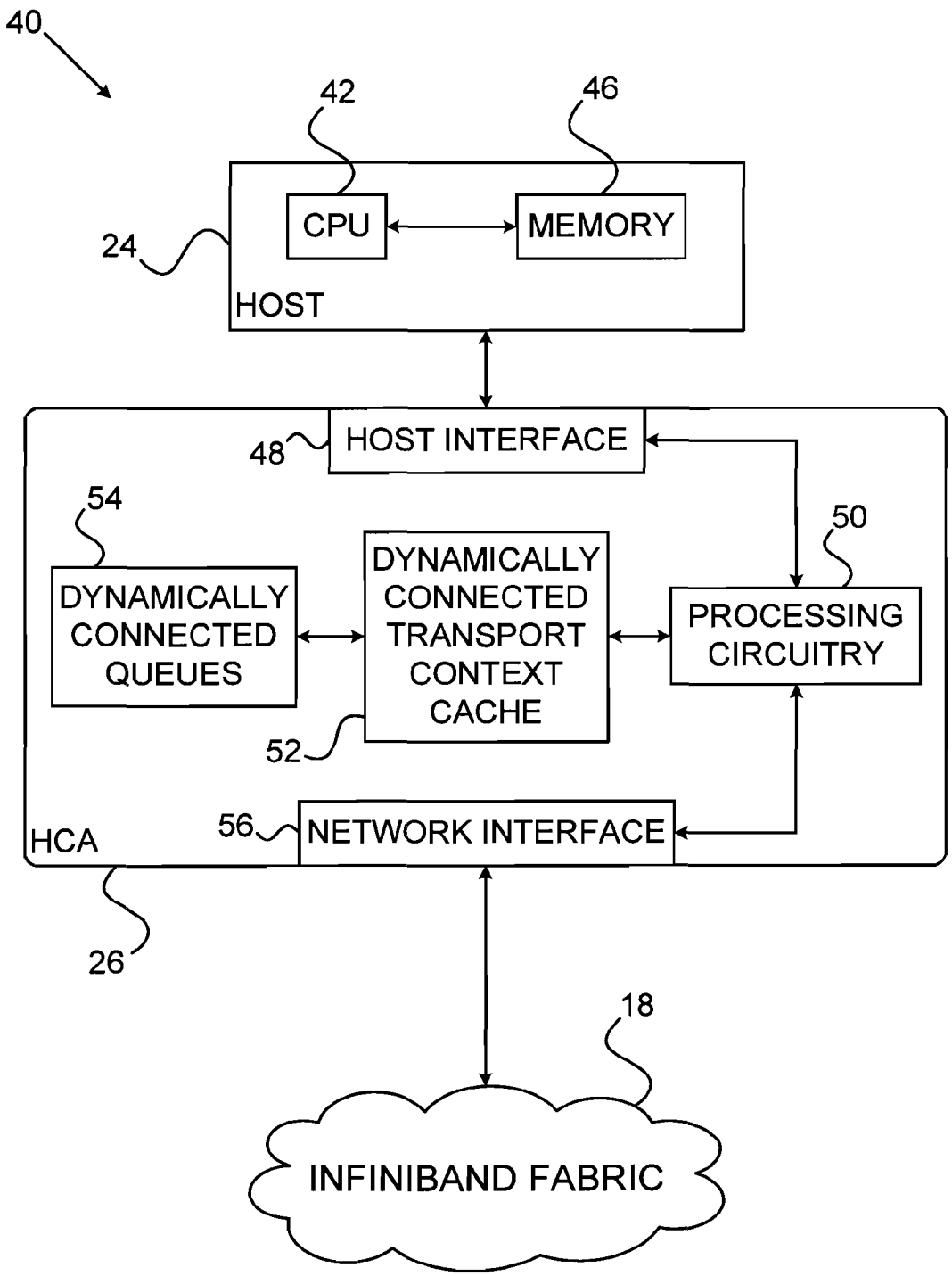
FIG. 2 is a block diagram that schematically illustrates the functional components of a host channel adapter that establishes dynamically-connected queue pairs, in accordance with an embodiment of the present invention.

FIG. 2 is a block diagram 40 that schematically illustrates functional components of HCA 26 (for initiator node 12) that are involved in establishing DC initiator and responder queues, in accordance with an embodiment of the present invention. (The structure of HCA 32 for responder node 14 and HCA 38 for responder node 16 would be similar.) In this example, HCA 26 receives a work request, such as a RDMA request, from a host CPU 42 via a host interface 48. Carrying out the work request involves transmitting one or more messages containing data from a host memory 46 to network 18. The structure of HCA 26 that is shown and described here is highly simplified to include only those elements that are necessary for an understanding of how the signature processing functions of the HCA may be implemented. This implementation is described only by way of example; alternative implementations will be apparent to those skilled in the art and are considered to be within the scope of the present invention.

Processing circuitry 50 uses a DC initiator context, which is typically held in a DC transport context cache 52, to establish a connection for a process executing on host 24. The connection uses an initiator DC queue, which may be selected from a group of DC queues 54 that are available on HCA 26. Each process typically maintains its own set of one or more dedicated DC contexts that it exclusively owns. HCA 26 transfers these DC contexts from host memory 46 to DC context cache 52 as needed.

HCA 26 transmits the message data packets, via a network interface 56, to responder node 14. Once HCA 26 completes sending all the message data packets, processing circuitry 50 on HCA 32 tears down the DC responder context connection, and the DC responder context becomes available for a new connection.

On the receiving end, HCA 32 (or HCA 38) receives DC connect packets and message data packets from network 18 via network interface 56. The packets are directed to a DC Target (DCT) on HCA 32, which allows grouping of individual DC responder contexts that belong to a single logical entity and are equally available for connect requests targeting that DCT. The receiving HCA allocates a DC responder context from the DCT group to serve the connection. The association between the data packets sent by the DC requester and the specific DC responder context that is currently serving relevant given connection is maintained by the responder based on the source queue pair number and the network address of the requester.

Processing circuitry 50 on HCA 32 typically maintains the allocated DC responder context in DC transport context cache 52. Message data packets received via network interface 56 are queued and processed by the HCA, and the data is then sent to the responder process via host interface 48. Upon receiving a disconnect packet, processing circuitry 50 tears down the responder side of the DC connection.

Dynamically-Connected Packet Transfer and Management

Figure 3:
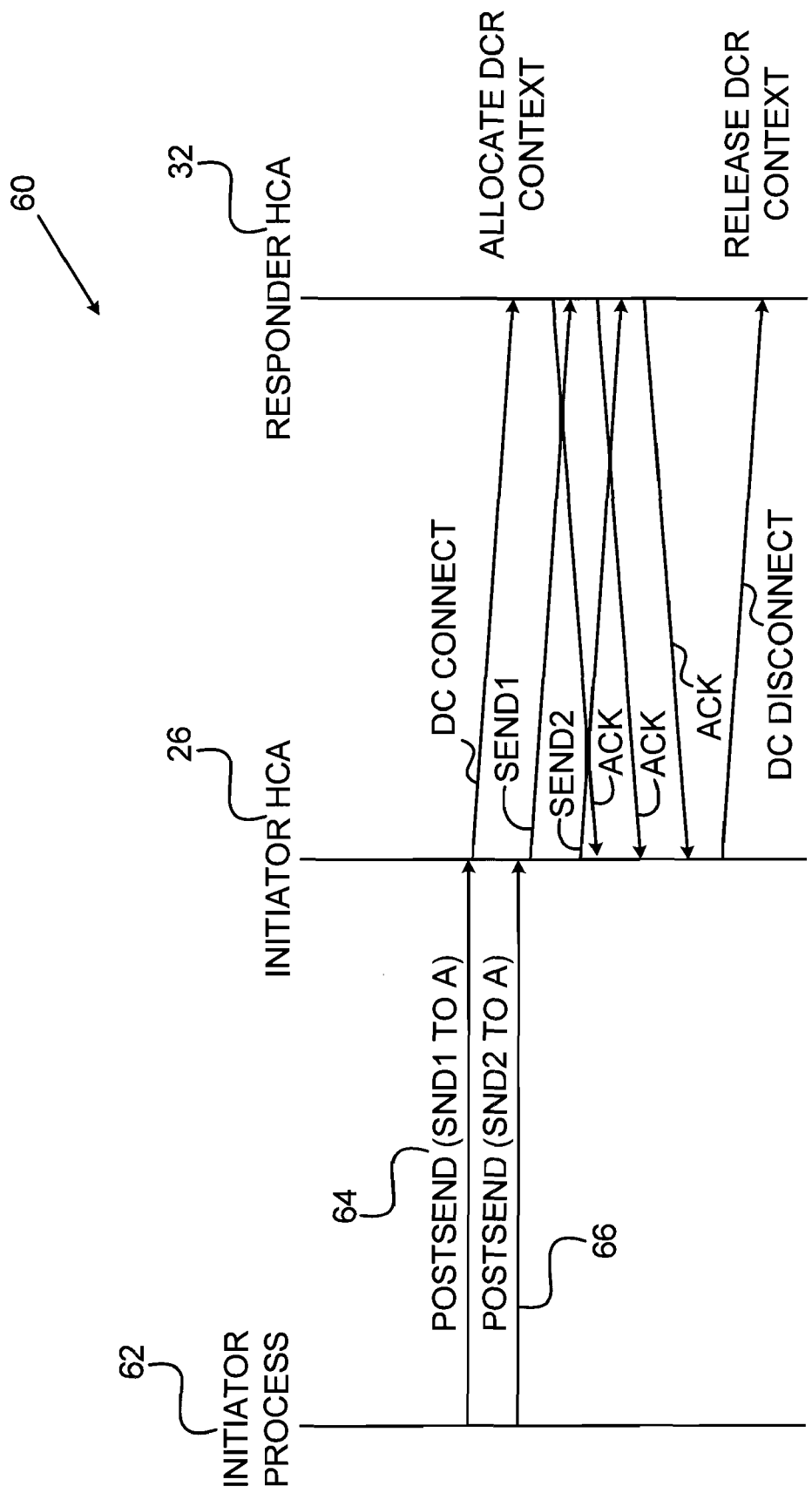
FIG. 3 is a ladder diagram that schematically illustrates a basic dynamically-connected connect-data-disconnect sequence, in accordance with an embodiment of the present invention.

FIG. 3 is a ladder diagram 60 that schematically illustrates a basic DC connect-data-disconnect sequence, in accordance with an embodiment of the present invention. An initiator process 62 submits work requests, which result in queuing of WQEs 64, 66 for execution by HCA 26, invoking messages to be sent to a process executing on node 14 of network 18. Upon receiving WQE 64, HCA 26 recognizes that it is not connected to the DC target, and therefore sends a DC connect packet to HCA 32. The connect packet identifies the destination process by means of the DCT, which is taken from the WQE and is inserted by HCA 26 in the destination QP field of the BTH in the connect packet. HCA 32 allocates a DC responder (DCR) context and may send an acknowledgement (ACK) data packet back to HCA 26. (Typically, however, the responder does not acknowledge the DC connect packet and acknowledges only some of the subsequent data packets, since each ACK packet implicitly acknowledges all of the connect and data packets that were sent previously over this connection.) After sending the DC connect packet, HCA 26 sends message data packets, corresponding to WQEs 64 and 66, to HCA 32, without waiting to receive the ACK from HCA 32.

After executing WQE 66, which is the last WQE in the DC send queue, HCA 26 waits to receive acknowledgments (explicit or implicit) from HCA 32 for the message data packets. If HCA 26 fails to receive the expected ACK, it may retransmit some or all of the packets, in accordance with reliable connection protocol. After receiving the last ACK (i.e., an acknowledgment indicating that all packets were received at HCA 32), HCA 26 sends a disconnect packet to HCA 32. After receiving the disconnect packet, HCA 32 tears down the DCT context, but does not respond with another ACK packet.

Figure 4:
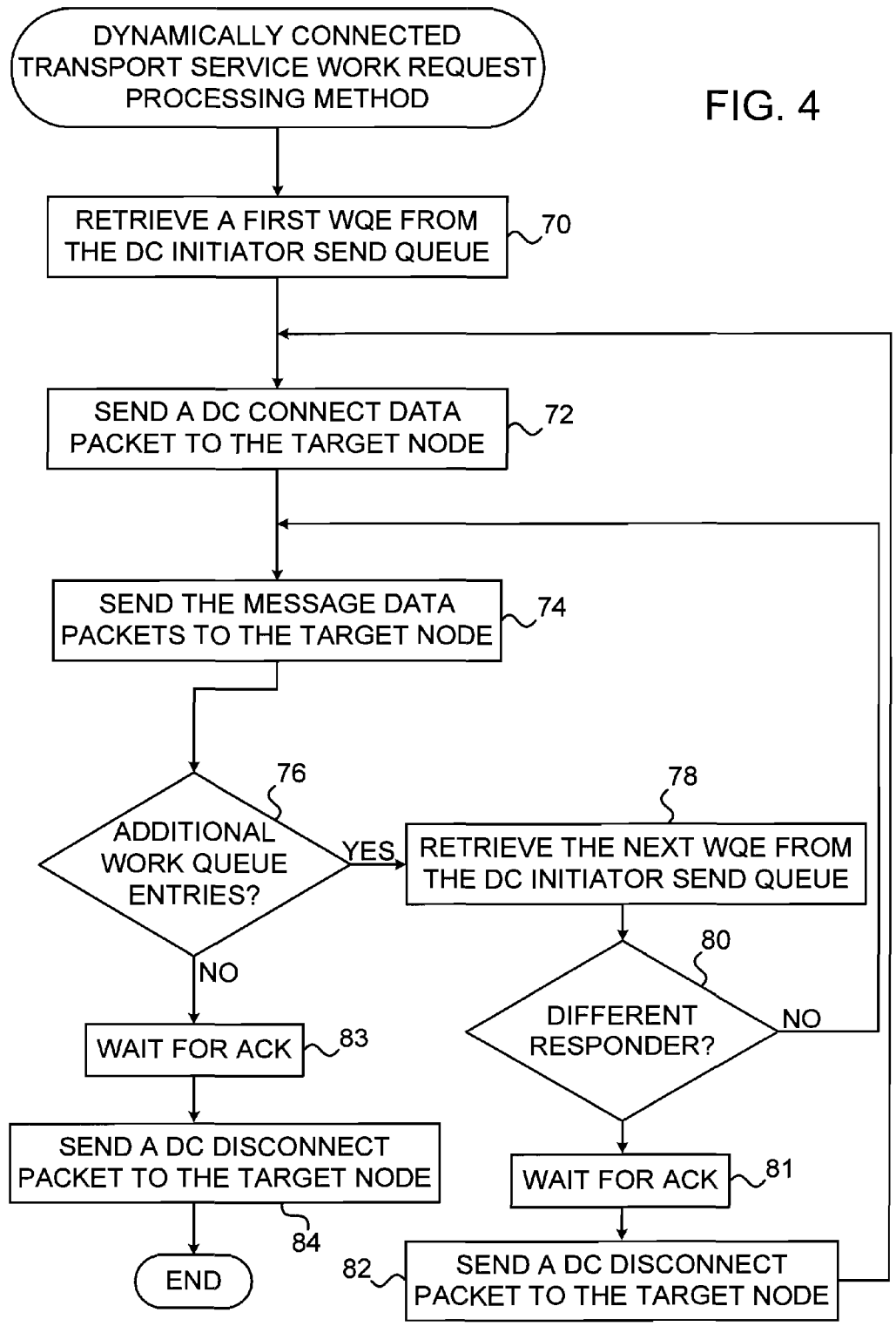
FIG. 4 is a flow diagram that schematically illustrates a method for processing a work request using a dynamically-connected transport service, in accordance with an embodiment of the present invention.

FIG. 4 is a flow diagram that schematically illustrates a method for processing DC transport service work requests, in accordance with an embodiment of the present invention. The method is described here, for the sake of clarity, with reference to the functional blocks and data structures shown in the preceding figures, although it may alternatively be implemented using other circuits and data structures, as will be apparent to those skilled in the art upon reading the following description.

HCA 26 receives a first WQE from an initiator process executing on host 12 (step 70) via host interface 48. The WQE indicates a message to be sent to a process executing on host 14. HCA 26 detects that it is not connected to a responder context, and therefore sends a connect packet to responder HCA 32 via network interface 56 over network 18 (step 72). This packet establishes a connection between the initiator DC context on HCA 26 and the DCT on HCA 32. HCA 26 then sends the message data packet from the work request through the DC initiator context via network interface 56 (step 74).

If there are additional WQEs in the DC initiator send queue (step 76), then HCA 26 retrieves the next WQE (step 78). If the retrieved WQE references the connected responder DCT (step 80), then the method returns to step 74. Otherwise, HCA 26 waits to receive acknowledgments (explicit or implicit) from the current responder for all packets that HCA 26 has transmitted (step 81). Upon receiving the expected acknowledgment, HCA 26 sends a disconnect packet to HCA 32 in order to tear down the DC connection (step 82) and the method returns to step 72. Returning to step 76, if there are no more WQEs in the DC initiator send queue, HCA 26 waits to receive an ACK packet from the current responder (step 83), and then sends a disconnect packet to HCA 32 (step 84).

HCA 26 typically sends the data packets immediately after the connect request. The data packets are guaranteed to arrive in order (after the corresponding connect) by virtue of using the same link layer parameters as the connect itself. This guaranteed ordering eliminates the need for HCA 26 to wait for an ACK after sending each connect or message data packet before processing the next WQE. Before sending a disconnect packet, HCA 26 checks (at step 81 or 83) that it has received ACK messages from HCA 32 for the connect packet and all message data packets. The HCA may resend the connect packet and/or one or more of the data packets if it did not receive the corresponding ACK packet within an applicable timeout period. However, there is no need to wait for an ACK after HCA 26 sends a disconnect packet.

Figure 5:
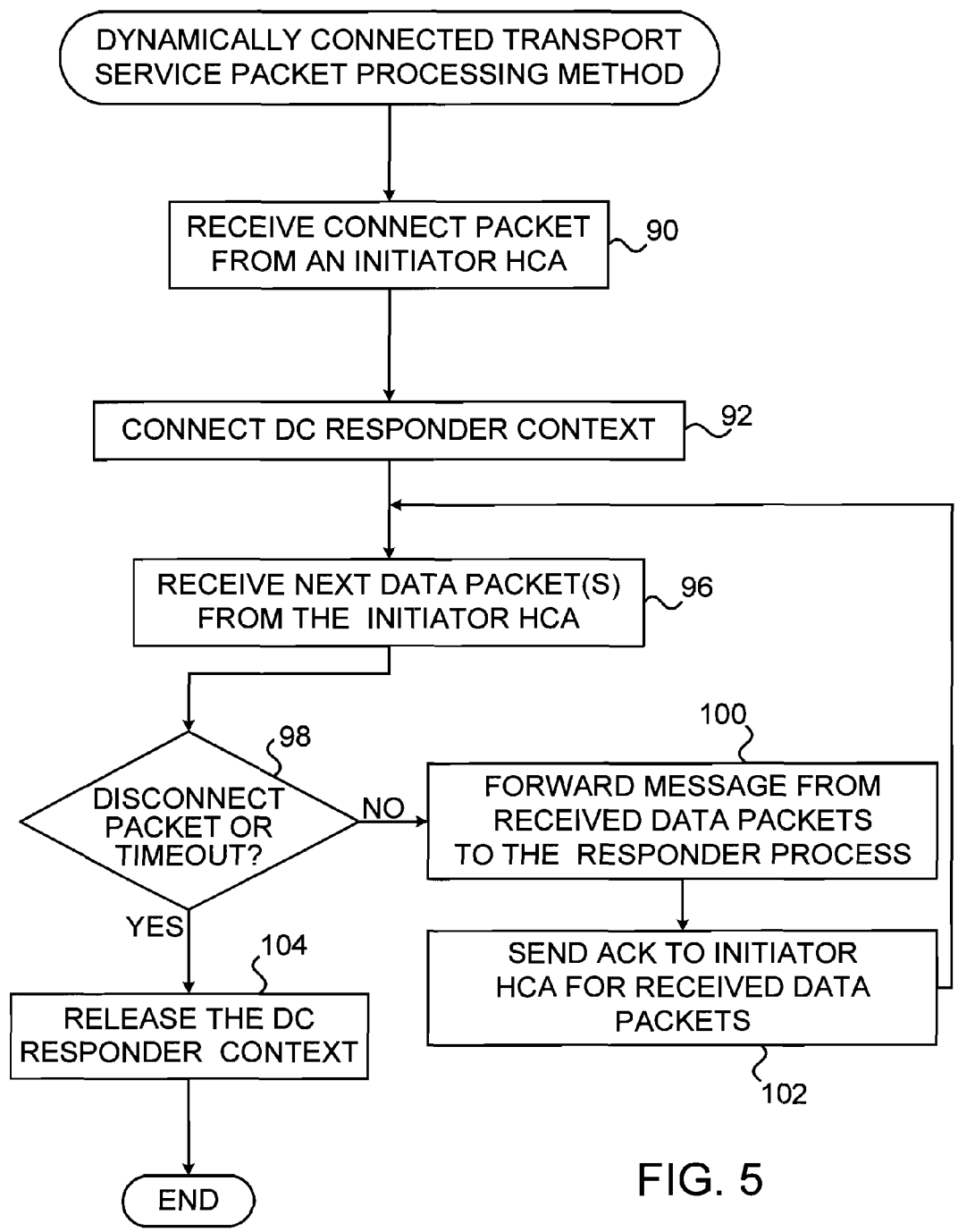
FIG. 5 is a flow diagram that schematically illustrates a method for processing packets received on a dynamically-connected transport service, in accordance with an embodiment of the present invention.

FIG. 5 is a flow diagram that schematically illustrates a method for processing packets received on a DC transport service, in accordance with an embodiment of the present invention. HCA 32 (i.e., the responder HCA) receives a connect packet from HCA 26 over network 18, via network interface 56 (step 90). The DC connect packet carries all the information required to establish the temporary relationship between the sending DC initiator and one DC responder context at the target node. Upon reception of a connect request packet, the destination node attempts to allocate a DC responder context out of the pool of responders in the DCT targeted by the connect request. Processing circuitry 50 finds the appropriate DC responder context in context cache 52 and establishes the connection using the appropriate receive queue from DC Queues 54 (step 92). (Multiple receive queues may be associated with a single DCT, and transport contexts associated with a single shared receive queue can be associated with different DCTs.) If the allocation is successful, the dynamic context is made operational, ready to process inbound request packets. HCA 32 may send an ACK data packet back to HCA 26 acknowledging receipt of the connect packet, but typically sends ACKs only in response to subsequent data packets. If a violation is detected, or there are no available contexts to handle the request, a NAK is sent back to the initiator.

Following the connect packet, HCA 32 receives the first message data packet from HCA 26 over network 18, via network interface 56 (step 96). If the received data packet is not a disconnect packet (step 98), then HCA 32 forwards the received message data to the appropriate responder process executing on host 30 (step 100). HCA 32 may send an ACK packet back to HCA 26 (step 102), acknowledging receipt of the message data packet, and the method returns to step 96. If, however, the received data packet at step 98 is a disconnect packet, or if a preset time expires without receipt of further packets on the connection, processing circuitry 50 tears down the association between the responder process and the DC responder context (step 104). The context then becomes available to connections from additional initiator processes.

Typically, the disconnect packet is not acknowledged by the responder HCA. This approach is meant to optimize for the usual case, in which disconnect packets are not lost and reach the destination in the necessary time. Not waiting for a disconnect acknowledgement allows for a subsequent connect request (upon detection of a different destination on the next WQE) to proceed immediately following the disconnect from the previously connected responder. In the rare cases in which the disconnect packet does not reach the responder, a responder timeout mechanism in processing circuitry 50 will eventually release the DC responder context anyway.

Figure 6:
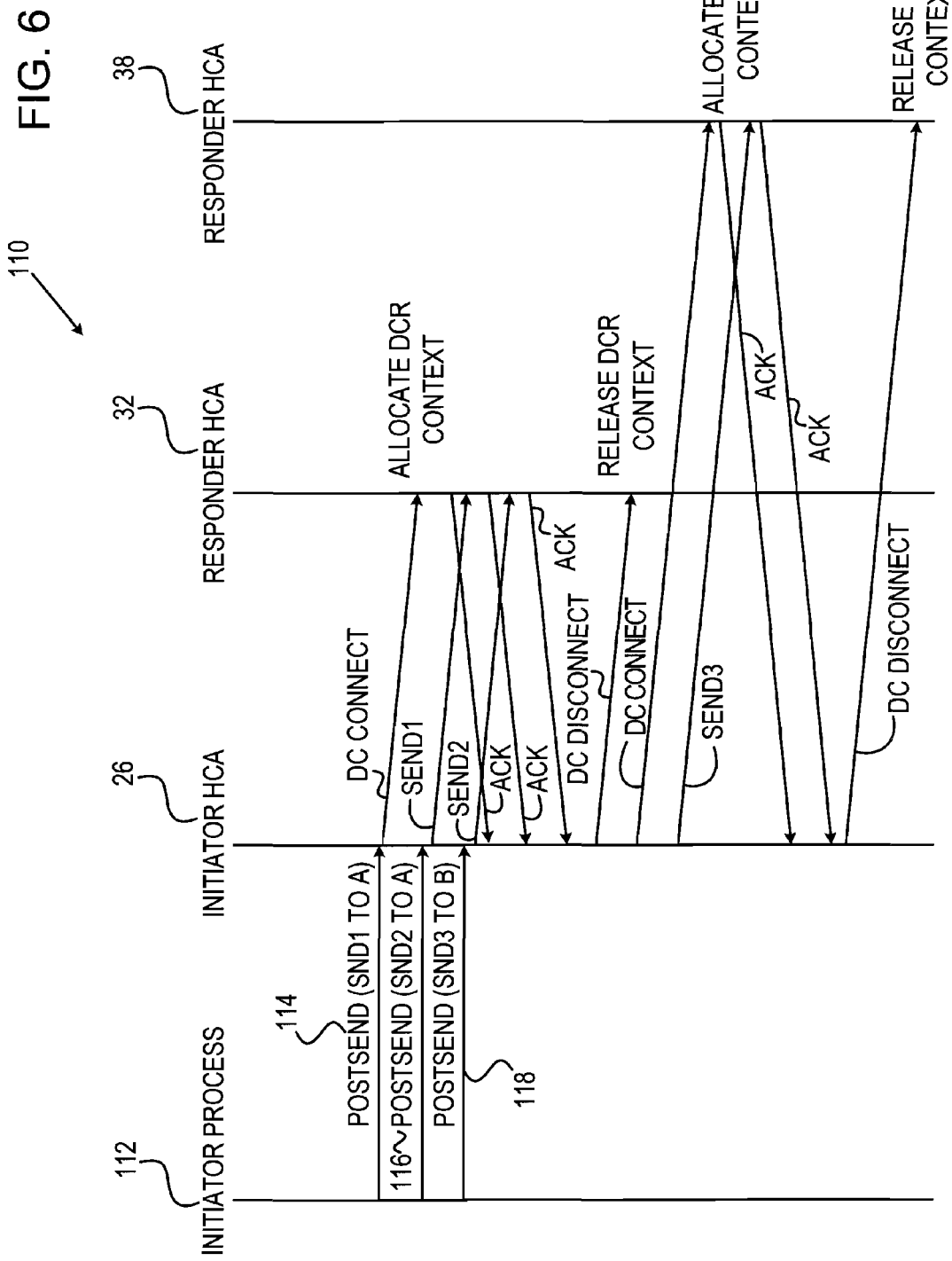
FIG. 6 is a ladder diagram that schematically illustrates a dynamically-connected data transfer between an initiator node and two responder nodes, in accordance with an embodiment of the present invention.

FIG. 6 is a ladder diagram 110 that schematically illustrates DC data transfers between an initiator HCA and two responder HCAs, in accordance with an embodiment of the present invention. An initiator process 112 sends a sequence of work requests, which result in queuing of WQEs 114, 116 and 118 for execution by HCA 26. The WQEs specify two messages to be sent to a process executing on node 14 (node "A" in the figure), followed by a message to be sent to another process executing on node 16 (node "B") of network 18. Upon processing WQE 114, HCA 26 recognizes that it is not connected to the specified DCT, and therefore sends a DC connect packet to HCA 32. After sending the DC connect packet, HCA 26 sends the message data packets specified by WQEs 114 and 116 to HCA 32. Since WQE 118 targets a different responder process, HCA 26 waits to receive the expected acknowledgment for the message data packets from HCA 32, and then sends a DC disconnect packet to HCA 32.

Upon processing WQE 118, HCA 26 sends a DC connect packet to HCA 38. After sending the DC connect packet, HCA 26 sends the message data packets specified by WQE 118 to HCA 32. Since WQE 118 is the last WQE in the DC send queue, HCA 26 waits to receive the expected acknowledgment for the message data packets from HCA 38, and then sends a DC disconnect packet to HCA 38. After receiving the disconnect packet, HCA 38 tears down the responder DC context, but does not respond with an ACK data packet.

Figure 7:
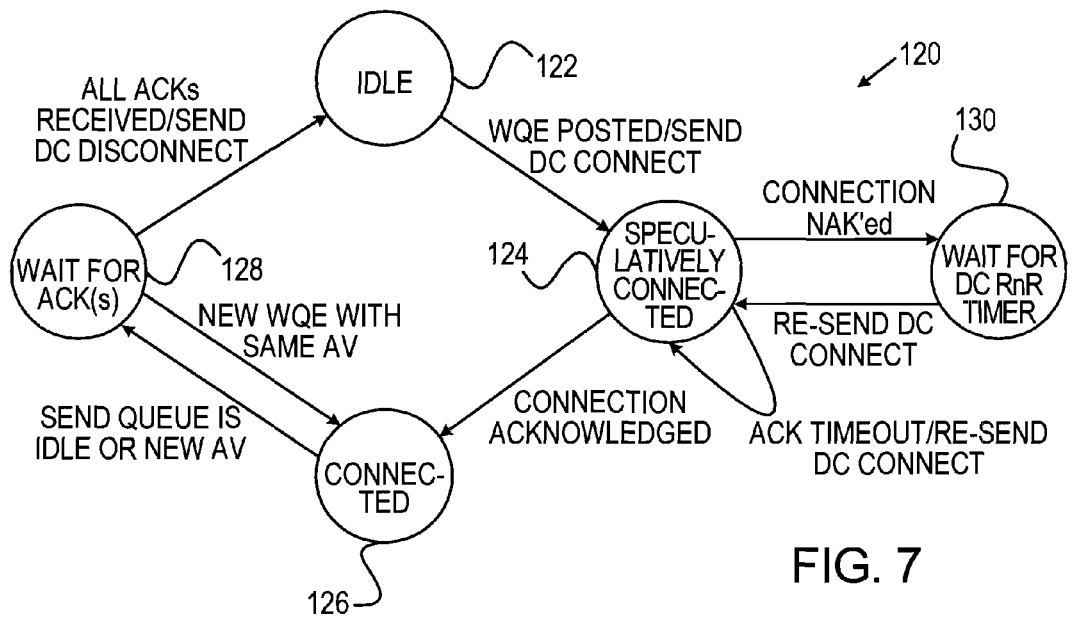
FIG. 7 is a state diagram that schematically illustrates a DC initiator context state machine, in accordance with an embodiment of the present invention.

FIG. 7 is a state diagram that schematically illustrates a DC initiator context state machine 120, in accordance with an embodiment of the present invention. The DC initiator in this example runs on HCA 26. Each DC initiator starts out in an idle state 122. Upon posting of a DC WQE, the DC initiator sends a DC connect packet to the remote peer whose address vector is specified in the WQE and moves the initiator to a speculatively-connected state 124. In this state, initiator HCA 26 sends data packets and awaits an ACK packet from the responder. If the ACK is not received within a predetermined timeout period, HCA 26 re-sends the data packets until a response is received. Optionally, as shown in the figure, HCA 26 may re-send the DC connect packet. In an alternative embodiment, however, the DC connect packet is sent to a given responder only once; and if no ACK is received, HCA 26 simply informs the requesting software process on host 24 that the connection attempt has failed.

Upon receiving the ACK from the responder, the DC initiator moves to a connected state 126. In this state, the DC initiator implements all RC transport and protection checks and actions (e.g., a re-send in case of any transport errors, RnR [receiver not ready], NAKs, etc.). An error condition that normally would cause RC QP closure (e.g., access violation, retries exceeded, etc.) will likewise lead to closure of the DC connection. In such a case, HCA 26 sends a DC disconnect packet, clears the send queue, and puts the send queue into an ERROR state.

Upon either reaching the end of the send queue or reaching an address vector that does not match the current connection, the DC initiator moves to a wait-for-ACKs state 128. In this state, the DC initiator continues to implement the transport and protection checks and actions until HCA 26 receives an ACK for all outstanding messages. When all ACKs have been received, without receiving a new WQE with the same address vector as before, the DC initiator sends a DC disconnect packet to the responder and returns to idle state 122. (Error behavior in state 128 is same as in connected state 126.)

Referring back to speculatively-connected state 124, it may occur that the DC initiator receives a NAK response to the DC connect packet, if the responder DCT is not available, for example. In this case, the DC initiator moves to a DC-RnR wait state 130, and remains in this state until a predetermined time has elapsed. The waiting time is controlled by a configurable DC-RnR timer. When the timer has expired, the DC initiator re-sends the DC connect packet and returns to state 124.

Figure 8:
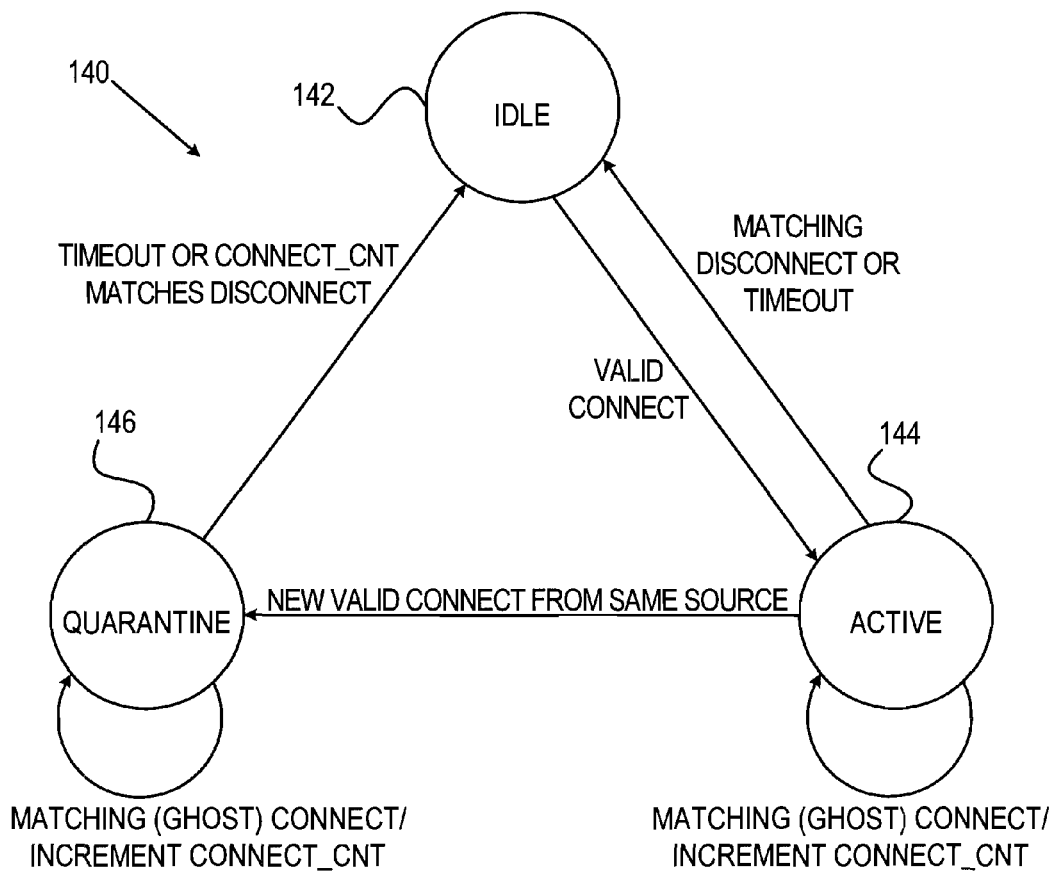
FIG. 8 is a state diagram that schematically illustrates a DC responder context state machine, in accordance with an embodiment of the present invention.

FIG. 8 is a state diagram that schematically illustrates a DC responder context state machine 140, in accordance with an embodiment of the present invention. In this example, the DC responder runs on HCA 32. Each DC responder (i.e., each receive queue associated with a DCT) begins in an idle state 142. Upon receiving a connect packet, the DC responder moves to an active state 144. While in the active state, the DC responder sends ACK packets as required to the DC initiator. The DC responder normally remains in the active state until it receives a disconnect packet or until a timeout period has expired without receipt of further packets from the DC initiator, whereupon the DC responder moves back to idle state 142.

As noted above in reference to FIG. 7, there may be certain conditions, in some embodiments, that may prompt a DC initiator to retry a DC connect. Although usually such retries will occur when the previous DC connect packet has been lost, it is also possible, if unlikely, that one or more previous DC connect packets may have not arrived at the intended destination, but may still be in the IB fabric (as a result of transient re-configuration of the routing tables, for example). Under such circumstances, a previous DC connect packet (referred to herein as a "ghost connect") may eventually find its way to the original destination. Handling of these ghost connect packets is shown in the figure and described hereinbelow for the sake of completeness; but such handling is not generally needed in alternative embodiments, as mentioned above, in which the requester HCA sends only a single DC connect packet before reporting a failure to the requesting software process.

To prevent possible misinterpretation of a ghost connect by responder HCA 32 as a new connection request, the DC responder in active state 144 may keep track of the DC connect packets that it receives and may keep the DCT context alive (even after receiving a disconnect packet) for those connections for which it has not yet received all of the instances of the DC connect. Keeping the connection context active allows the responder to identify any ghost connects (as their packet serial numbers match the connection context) and to avoid treating them as new connect requests. The DC responder counts the number of ghost connects, counting only requests that were repeated due to timeout (i.e., not counting explicitly NAK responses).

When HCA 32 receives a DC disconnect packet in active state 144, it may check whether the number of repeated DC connect packets indicated by the DC initiator matches the number received by the DC responder. If so, responder HCA 32 can safely close the DC responder context and return to idle state 142. Otherwise, the DC responder may move to a "quarantine" state 146 until all remaining DC connect packets are received, or until a predetermined timeout has elapsed. Alternatively, in embodiments that do not require handling of ghost connections, state 146 may be unnecessary, in which case, the DC responder will simply return to idle state 142 immediately upon receiving a DC disconnect packet.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The invention claimed is:

1. A method of communication, comprising:
   receiving, in a network interface device coupled to an initiator host, first and second requests from an initiator process running on the initiator host to transmit, respectively, first and second data to first and second target processes running respectively on different first and second target nodes, via a packet network;
   allocating in the network interface device a single dynamically-connected initiator context for serving both the first and second requests;
   transmitting from the network interface device over the packet network a first connect packet referencing the dynamically-connected (DC) initiator context and directed to the first target process so as to open a first dynamic connection with the first target process, followed by transmission of the first data over the first dynamic connection; and
   closing the first dynamic connection after the transmission of the first data, and transmitting a second connect packet referencing the DC initiator context and directed to the second target process so as to open a second dynamic connection with the second target process, followed by transmission of the second data over the second dynamic connection.

2. The method according to claim 1, and comprising receiving an acknowledgment packet from the first target node in response to transmitting the data.

3. The method according to claim 2, wherein the network interface device transmits the first data over the first dynamic connection without waiting for any acknowledgment from the first target node.

4. The method according to claim 2, wherein closing the first dynamic connection comprises waiting to close the first dynamic connection until the network interface device has received the acknowledgment packet.

5. The method according to claim 1, wherein closing the first dynamic connection comprises transmitting a disconnect packet over the first dynamic connection to the first target process.

6. The method according to claim 5, wherein the first target node does not acknowledge the disconnect packet, and wherein the second connect packet is transmitted immediately after transmitting the disconnect packet.

7. The method according to claim 1, wherein receiving the first and second requests comprises queuing, for execution by the network interface device, one or more first work queue elements (WQEs) referencing the first target process, followed by one or more second WQEs referencing to the second target process, and wherein the network interface device closes the first dynamic connection upon reaching a first one of the second WQEs for execution.

8. The method according to claim 1, and comprising, upon receiving the first connect packet at a target node, allocating a DC responder context for receiving the first data at the target node, and after closing the first dynamic connection, reallocating the DC responder context at the target node to receive further data from another DC initiator.

9. The method according to claim 8, wherein allocating the DC responder context comprises selecting the DC responder context from a group of DC responder contexts belonging to a DC target specified by the first connect packet.

10. The method according to claim 8, wherein receiving the first connect packet comprises receiving and counting multiple connect packets at the target node from the DC initiator context in response to retries by the network interface device, and reallocating the DC target context after all of the connect packets have been received.

11. A network communication device, comprising:
   a host interface, which is coupled to receive from an initiator host first and second requests from an initiator process running on the initiator host to transmit, respectively, first and second data to first and second target processes running respectively on different first and second target nodes, via a packet network;
a network interface, coupled to the packet network; and
processing circuitry, which is configured, using a single dynamically-connected initiator context allocated to serve both the first and second requests, to transmit via the network interface a first connect packet referencing the dynamically-connected initiator context and directed to the first target process so as to open a first dynamic connection with the first target process, followed by transmission of the first data over the first dynamic connection, and to close the first dynamic connection after the transmission of the first data and to transmit via the network interface a second connect packet referencing the dynamically-connected initiator context and directed to the second target process so as to open a second dynamic connection with the second target process, followed by transmission of the second data over the second dynamic connection.

12. The device according to claim 11, wherein the processing circuitry is configured to receive and process an acknowledgment packet from the first target node in response to transmitting the first connect packet.

13. The device according to claim 12, wherein the processing circuitry is configured to transmit the first data over the first dynamic connection without waiting for any acknowledgment from the first target node.

14. The device according to claim 12, wherein the processing circuitry is configured to wait to close the first dynamic connection until the acknowledgment packet has been received.

15. The device according to claim 11, wherein the processing circuitry is configured to transmit a disconnect packet over the first dynamic connection to the first target process in order to close the first dynamic connection.

16. The device according to claim 15, wherein the first target node does not acknowledge the disconnect packet, and wherein the second connect packet is transmitted immediately after transmitting the disconnect packet.

17. The device according to claim 11, wherein the processing circuitry is configured to process a queue comprising one or more first work queue elements (WQEs) referencing the first target process, followed by one or more second WQEs referencing to the second target process, and to close the first dynamic connection upon reaching a first one of the second WQEs for execution.

18. A network communication system, comprising:
a first network interface device, which is coupled to an initiator host so as to receive first and second requests from an initiator process running on the initiator host to transmit, respectively, first and second data to first and second target processes running respectively on different first and second target nodes, via a packet network,
wherein the first network interface device is configured, using a single dynamically-connected initiator context allocated to serve both the first and second requests, to transmit via the network interface a first connect packet referencing the dynamically-connected initiator context and directed to the first target process so as to open a first dynamic connection with the first target process, followed by transmission of the first data over the first dynamic connection, and to close the first dynamic connection after the transmission of the first data and to transmit via the network interface a second connect packet referencing the dynamically-connected initiator context and directed to the second target process so as to open a second dynamic connection with the second target process, followed by transmission of the second data over the second dynamic connection; and
a second network interface device, which is coupled to a target host on the first target node and is configured upon receiving the first connect packet, to allocate a DC responder context for receiving the first data at the first target node, and after closing the first dynamic connection, to reallocate the DC responder context to receive further data from another DC initiator.

19. The system according to claim 18, wherein the second network interface device is configured to select the DC responder context from a group of DC responder contexts belonging to a DC target specified by the first connect packet.

20. The system according to claim 18, wherein the second network interface device is configured to count multiple connect packets received at the first target node from the DC initiator context in response to retries by the network interface device, and to reallocate the DC target context after all of the connect packets have been received.

* * * * *